United States Patent [19]

Wilson, Jr.

[11] 3,835,718
[45] Sept. 17, 1974

[54] IMPELLER MECHANISM
[76] Inventor: Thomas B. Wilson, Jr., 10481 Randall St., Orange, Calif. 92669
[22] Filed: July 24, 1972
[21] Appl. No.: 261,264

[52] U.S. Cl. .................................................. 74/86
[51] Int. Cl. ......................................... F16h 33/10
[58] Field of Search ............................. 74/18.1, 86

[56] References Cited
UNITED STATES PATENTS

| 2,374,663 | 5/1945 | Carrier, Jr. | 74/86 |
| 2,703,017 | 3/1955 | Smith | 74/86 |
| 3,044,310 | 7/1962 | Weber | 74/86 |
| 3,082,632 | 3/1963 | Vulliez | 74/18.1 |
| 3,247,731 | 4/1966 | Chapman | 74/18.1 |

FOREIGN PATENTS OR APPLICATIONS

| 512,438 | 6/1952 | Belgium | 74/86 |

Primary Examiner—Benjamin W. Wyche
Assistant Examiner—Wesley S. Ratliff, Jr.

[57] ABSTRACT

Impeller mechanism with an output which imparts a cyclic motion to a blade of variable configuration which results in the production of a predominant component of force or pressure when the blade is in contact with various substances into which it can penetrate or to which it can attach itself. The impeller mechanism consists of a minimum of two cranks constrained to rotate in a prescribed angular relationship to each other and with a blade of variable configuration attached to and free to rotate about the crank handles. Supporting structure, bearings, sealing mechanisms, covers and other ancillaries complete the impeller mechanism and adapt it to specific functional applications.

In a separate configuration, with the blade constrained to move along one axis only, the impeller mechanism is operated backwards by deriving energy from an expanding fluid to function as a prime mover or engine. Because of the unique configuration low pressure operation of the unit is possible with potentially great benefits to the environment by utilization of closed thermodynamic cycles or reduction of pollutants in conventional thermodynamic cycles.

8 Claims, 9 Drawing Figures

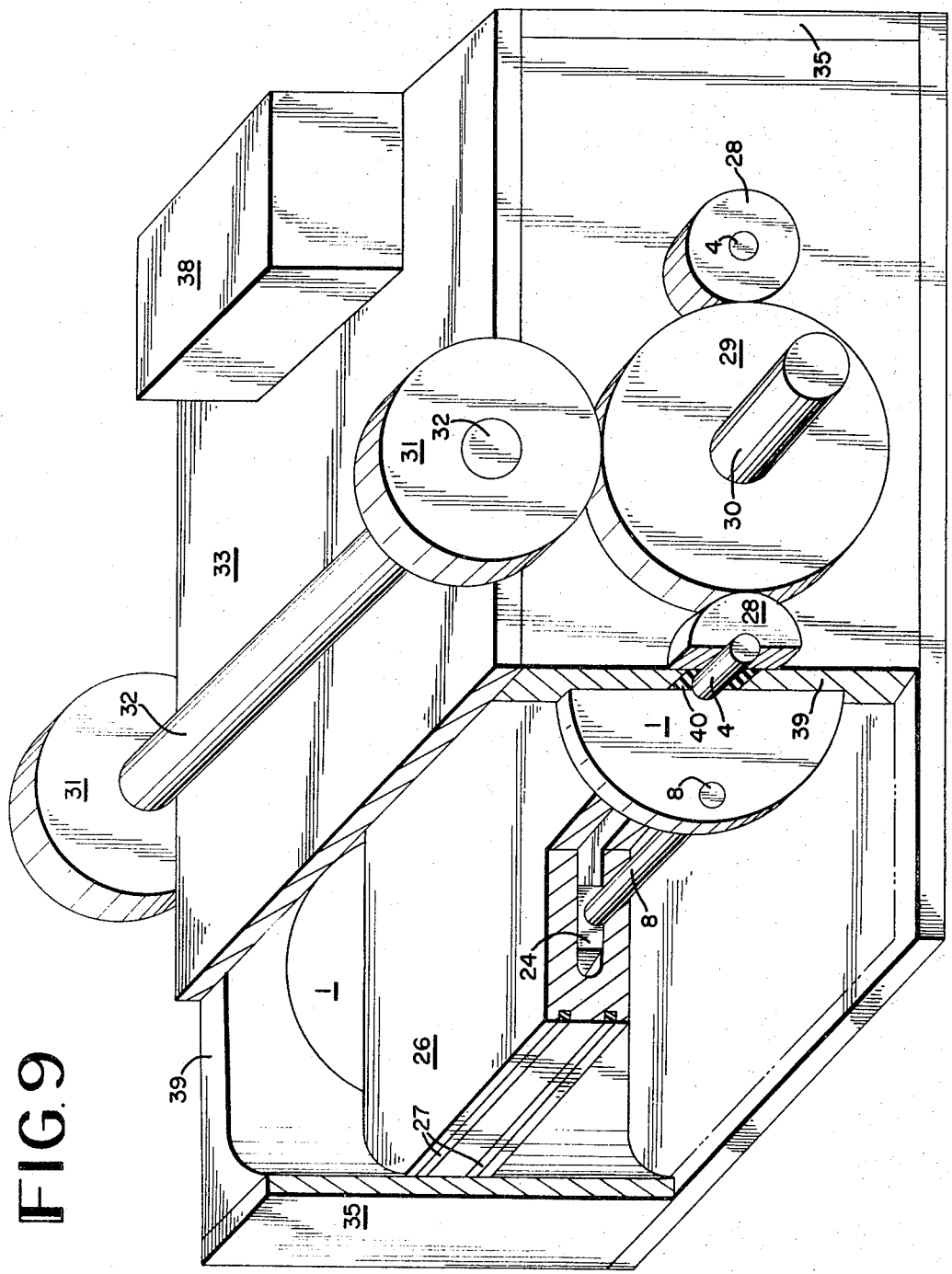

IMPELLER MECHANISM

BACKGROUND OF THE INVENTION

1. Field of the Invention

The present invention relates to transport systems in which various devices are utilized to move the substance/s within the transport system such as conventional forms of pumps or to move a structure floating on the surface of or within the substance/s such as a ship's propeller, and as prime movers or engines.

2. Description of the Prior Art

Many forms of force or pressure producing devices, pumps, and propulsive devices are available on the market but the applicant is not aware of any utilizing the basic mechanism described in the present impeller mechanism invention. The basic mechanism utilized in the present impeller mechanism invention is not described in any textbook on basic mechanisms, in any textbook or mechanics, or in any related handbooks to the applicant's knowledge in the fields marine engineering, naval architecture, hydraulics, civil engineering, mechanics, etc. The device most similar was the paddle wheel which was constrained to operate in the interface of air and water at the surface of the water and which was highly inefficient due to the resultant entrapment of air as the blades of the paddle wheels entered the water on their power stroke. In addition, the paddle wheels were extremely complex in their more sophisticated forms of higher efficiency and were limited to low revolutions per minute operation which was incompatible with the speed of their prime movers.

The same is true when the impeller mechanism is operated as a prime mover deriving energy from an expanding fluid. Many forms of prime movers are available on the market but none utilize the basic mechanism which forms the basis of the present invention.

SUMMARY OF THE INVENTION

The present invention relates to a cyclic impeller mechanism with an output which imparts a motion to a thin, stiff, boardlike blade of variable configuration which results in the production of a predominant component of force or pressure which can be utilized in the movement of various substances into which the blade can penetrate or to which the blade can attach itself and in which either the reaction to an attempt to move the substance or the action of the movement of the substance is the desired end result. In a separate configuration, with the blade constrained to move along one axis and confined in a cover where it can derive energy from an expanding fluid under pressure the impeller mechanism is operated backwards as a prime mover or engine. The invention consists essentially in the combination and arrangement of the several parts as will be hereinafter described in the specification, shown upon the drawings appended hereto and specifically pointed out in the claims made a part hereof.

BRIEF DESCRIPTION OF THE DRAWINGS

FIG. 9 is a cutaway perspective drawing which shows the same configuration as FIG. 8.

DESCRIPTION OF THE PREFERRED EMBODIMENT

Figure 1:
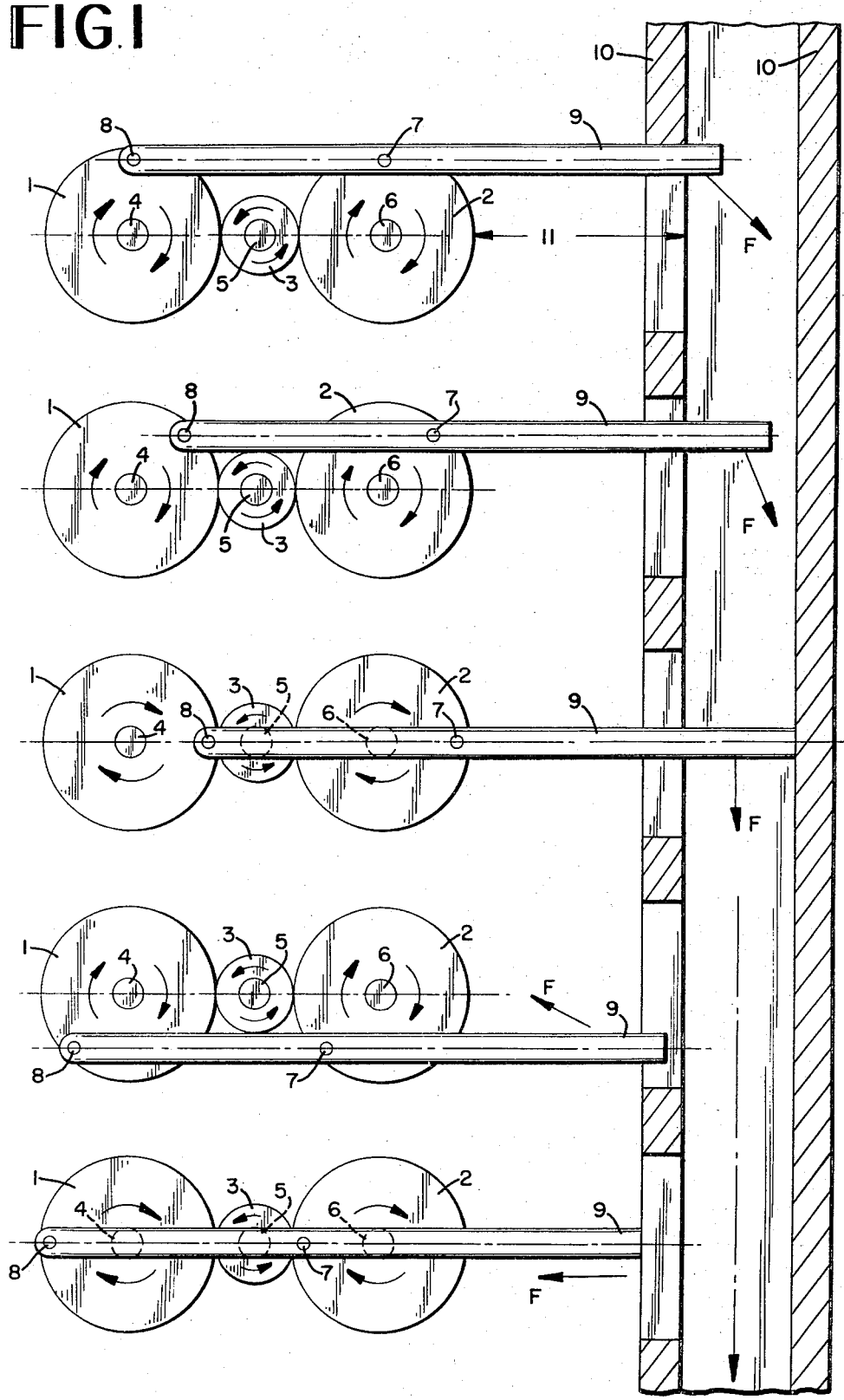
FIG. 1 is a diagramatic drawing showing five cyclic positions of the basic impeller mechanism.

Referring to the drawings, FIG. 1 shows five cyclic positions in which parallel motion of the blade 9 in a direction perpendicular to the axis connecting the centers of shafts 4 and 6 is obtained by utilizing the crank arm provided by placing the crank handles 7 and 8 radially outward on the discs 1 and 2 and attaching the blade 9 to the crank handles 7 and 8 in a manner which allows rotation of the blade 9 about their axes and by constraining discs 1 and 2 to rotate in a prescribed angular relationship to each other. One such method is shown where discs 1 and 2 represent gears driven by a common gear 3. When gear 3 is rotated in one direction both discs 1 and 2 rotated in the same but opposite direction to gear 3 in a fixed angular relationship. Friction, sprocket wheel and sprocket chain and other drives could give the same result.

By controlling the spatial relationship of the impeller mechanism to the channel 10 in which the substance to be acted upon is confined, and by utilizing the properties of the reciprocating action provided by the impeller mechanism, it is possible to rapidly introduce the blade 9 into the substance in the channel 10 when the force or pressure F produced by the motion of the blade 9 is in the desired direction 15 as shown in the three top cyclic positions and to remove the blade 9 from the substance in the channel 10 when the force or pressure F produced by the motion of the blade 9 is reversed or is in other than the desired direction 15. By reversing the direction of rotation of the gear 3 the rotation of the discs 1 and 2 is also reversed thus reversing the direction of motion of the blade 9 when it is in contact with the substance in the channel 10 and the motion of the blade 9 produces a force or pressure F which moves the substance in the channel 10 in a direction which is opposite to that shown in the drawing as the desired direction 15.

By controlling the length of the crank arms represented by the distance between the centers of the discs shafts 4 and 6 and the centers of the shafts of the cranks 7 and 8 and by controlling the spatial relationship 11 of the mechanism to the channel 10 in which the substance to be acted upon is confined and by utilizing the reciprocating action provided by the mechanism it is possible to control the depth of penetration of the blade 9 into the substance confined in the channel 10 and the length of the stroke perpendicular to the axis connecting the shaft centers 4, 5 and 6.

Figure 2:
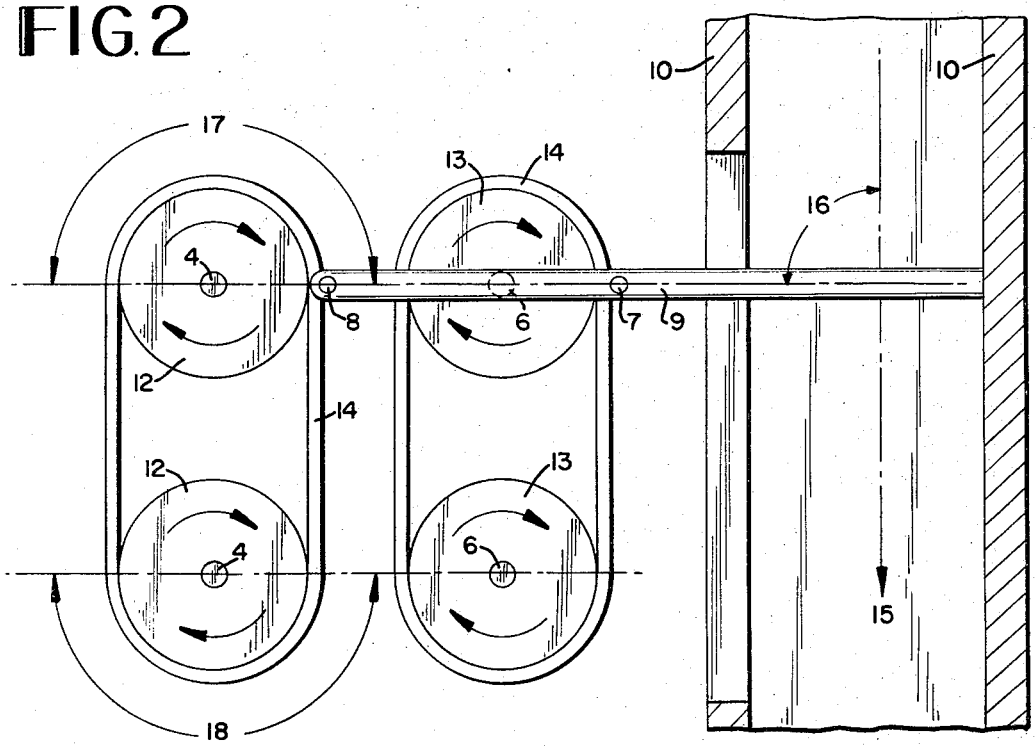
FIG. 2 is a diagramatic drawing showing a second configuration of the basic impeller mechanism with an increased stroke.

FIG. 2 is a diagramatic drawing which shows another configuration of the impeller mechanism in which the crank handles 7 and 8 have been removed from the discs 1 and 2 which have been replaced by pulleys or sprocket wheels 12 and 13 and have been attached to belts or sprocket chains 14. The blade 9 is attached as previously described. The pulleys or sprocket wheels 12 and 13 are constrained to revolve in a prescribed angular relationship to each other in a manner similar to that described for the discs 1 and 2 in FIG. 1. The reciprocating action previously described is obtained in this configuration as the handles 7 and 8 attached to the belts or sprocket chains 14 go through arcs 17 and 18 while at the same time the lemgth of the stroke perpendicular to the axis connecting the centers of shafts 4 and 6 can be extended as desired. In this configuration, the blade 9 travels the major portion of its path with uniform motion accelerating horizontally and vertically for a short interval as the handles 7 and 8 go through arc 17 while inserting the blade 9 into the substance confined in the channel 10 at an angle 16 perpendicular to the desired direction of motion 15 until it acquires its maximum desired penetration and commences its uniform motion. Upon completion of the uniform motion portion of its path the blade 9 decelerates horizontally and accelerates downward for a similar interval as the handles 7 and 8 go through arc 18 while removing the blade 9 from the substance confined in channel 10 while the motion of the blade 9 is reversed during the return stroke or in other than the desired direction of travel. The acceleration provided may be uniform or harmonic or of any other characteristic desired.

Figure 3:
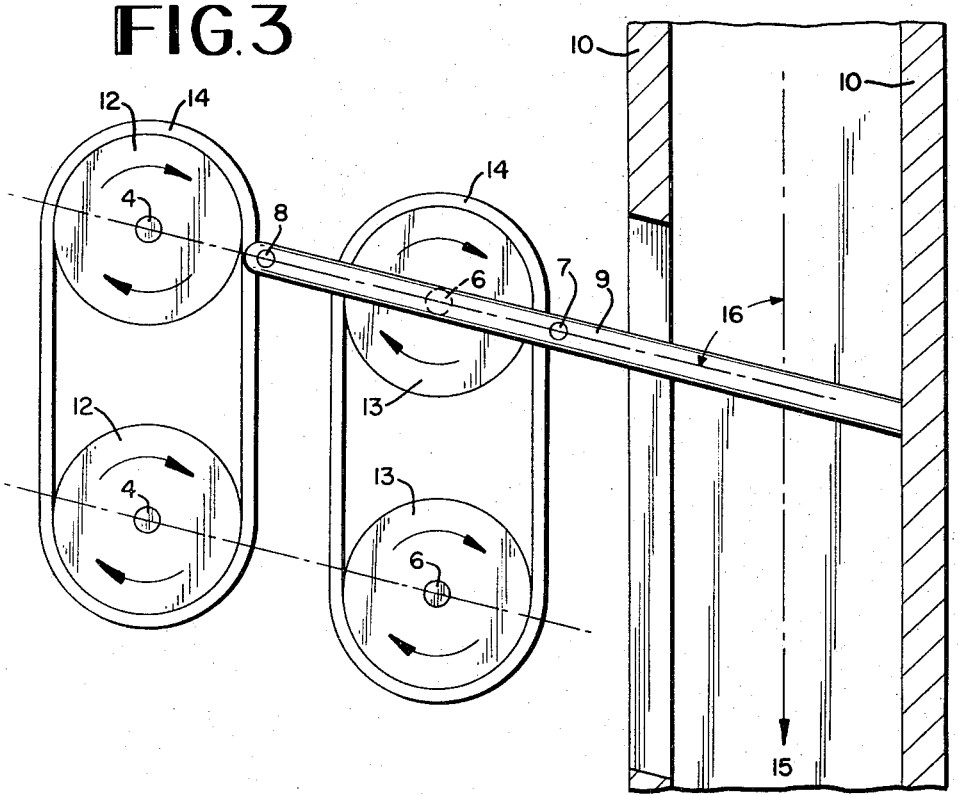
FIG. 3 is a diagramatic drawing showing a third configuration of the basic impeller mechanism similar to that shown in FIG. 2 with the angle of the impeller blade varied.

FIG. 3 is a diagramatic drawing showing another configuration of the impeller mechanism similar to that shown in FIG. 2 demonstrating that by varying the prescribed angle of the centerline connecting the centers of shafts 4 and 6 to the axis of motion desired 15 of the substance confined in the channel 10 the angle 16 of the blade upon entry, during uniform motion while the blade 9 is in the substance confined in the channel 10, during exit and during the return stroke while the blade 9 is not in contact with the substance confined in the channel 10, can be varied. The angle of the impeller mechanism shown in FIG. 1 can be varied in a similar manner.

Figure 4:
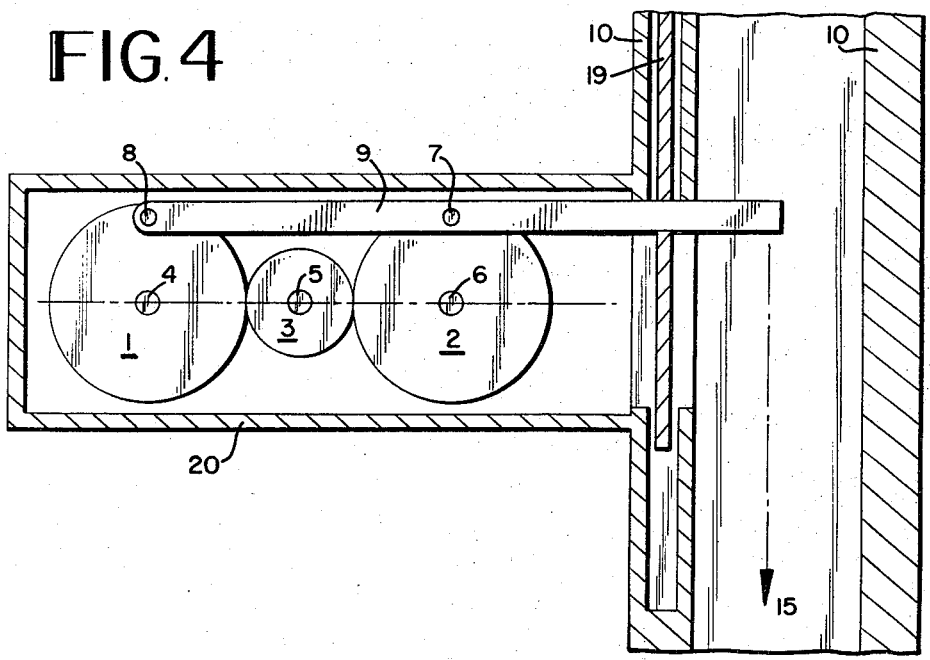
FIG. 4 is a diagramatic drawing which shows the basic impeller mechanism as shown in FIG. 1 with a sealing mechanism added.

FIG. 4 is a diagramatic drawing which shows the impeller mechanism as described in FIG. 1 with the addition of a sealing mechanism 19 which allows the blade 9 to penetrate in a direction parallel to the axis connecting the centers of shafts 4, 5 and 6 while at the same time allowing the blade 9 to travel in a direction perpendicular to the axis connecting the centers of shafts 4, 5 and 6 while isolating the impeller mechanism from the substance confined in channel 10. Further isolation of the impeller mechanism from its surrounding environment can be achieved by the installation of a cover 20.

Figure 5:
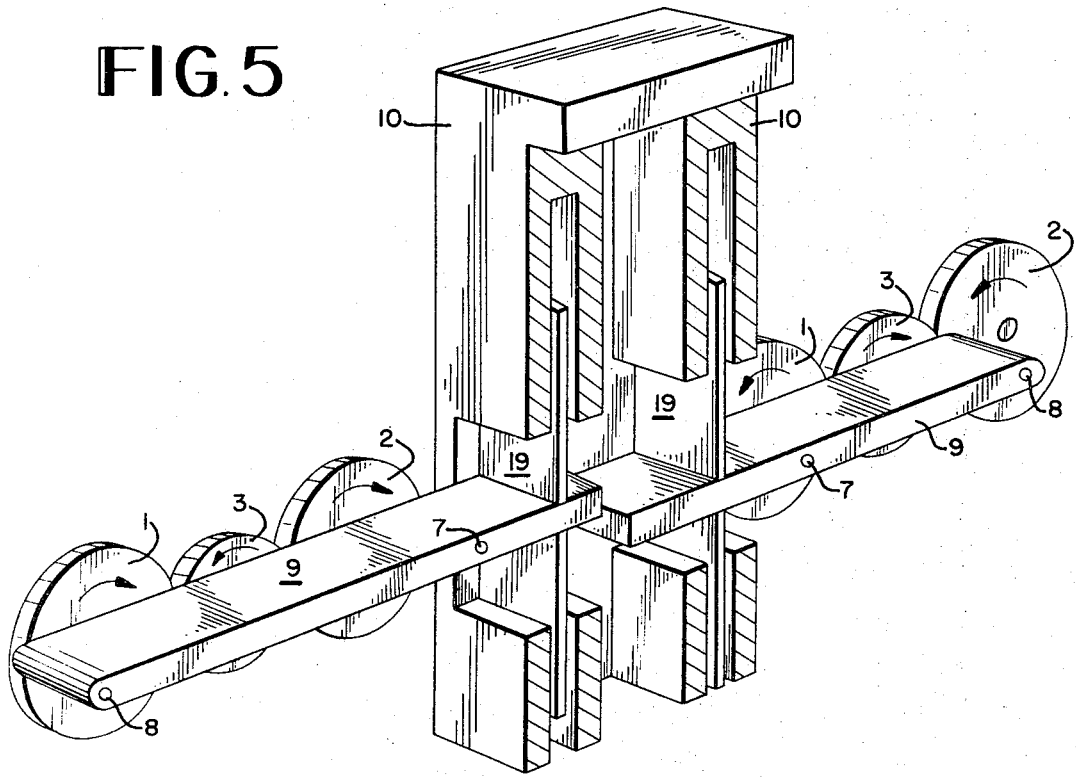
FIG. 5 is a cutaway perspective view which shows two of the basic impeller mechanisms as shown in FIGS. 1 and 4 installed in such a manner as to function as a pump.

FIG. 5 is a cutaway perspective view which shows two of the impeller mechanisms as described in FIGS. 1 and 4 installed in such a manner that the blades 9 penetrate an enclosed structure 10 such as a variable cross section pipe or semi-enclosed structure such as a trough or other open channel and are sealed from the substance by the sealing mechanism 19 to allow the impeller mechanism to function as a pump. By varying the number of impeller mechanisms installed and the phase relationships of the blades 9 in their cycles the pulsations attendant to the loss of the force or pressure associated with any one impeller mechanism while its blade is moving during its return stroke can be varied. As the number of impeller mechanisms installed increases, the pulsations decrease.

Figure 6:
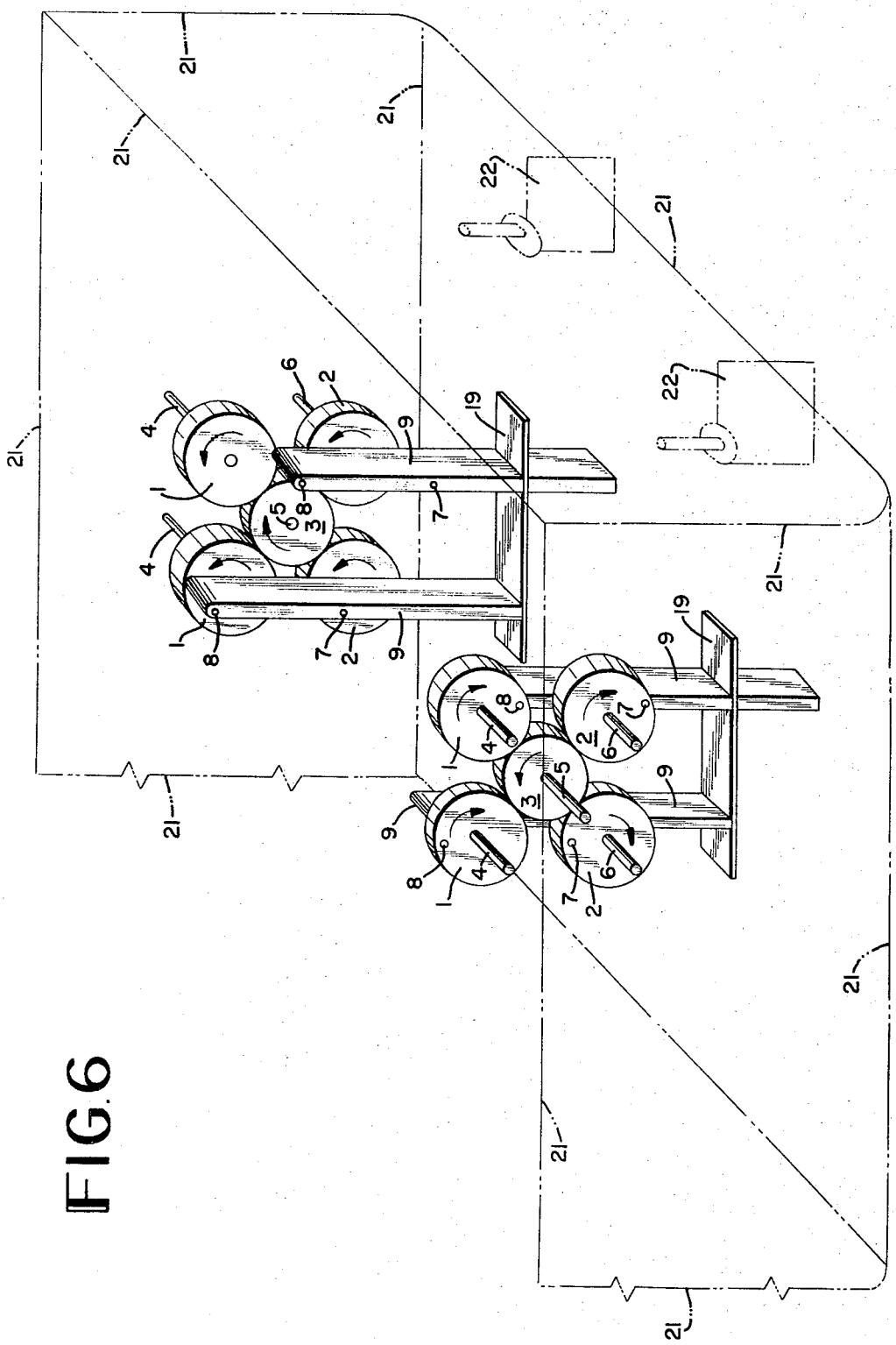
FIG. 6 is a cutaway isometric drawing which shows four of the basic impeller mechanisms as shown in FIGS. 1 and 4 installed in such a manner as to provide propulsive force to a ship.

FIG. 6 is a cutaway isometric drawing which shows four of the impeller mechanisms as described in FIGS. 1 and 4 installed in such a manner in a body such as a ship 21 floating in a fluid that the blades 9 penetrate the submerged exterior surface and the force or pressure produced by the blades 9 can be used to propel the ship. By placement of the impeller mechanism forward of the rudders 22 steering is obtained in a conventional manner. By placement of the mechanism at an angle other than parallel to the centerline of the body other motion control such as roll control, pitch control, or steering control can be achieved.

Figure 7:
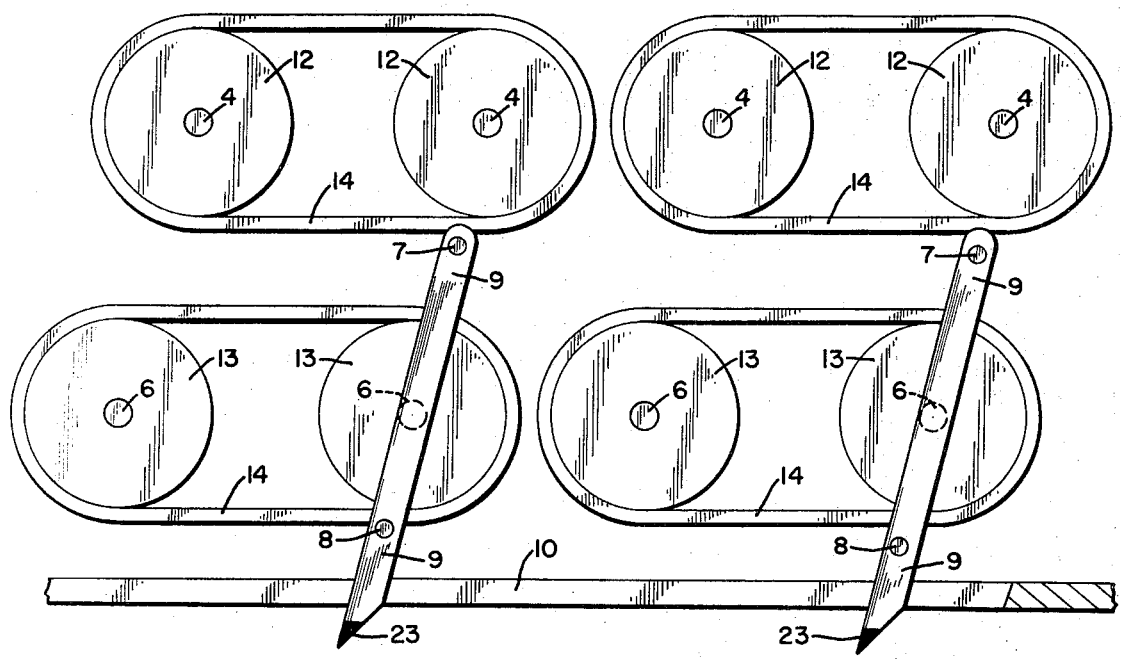
FIG. 7 is a diagramatic drawing which shows two of the basic impeller mechanisms as shown in FIG. 3 installed in such a manner as to move magnetic or hard material or to move along magnetic or hard material.

FIG. 7 is a diagramatic drawing which shows two of the basic impeller mechanisms as shown in FIG. 3 installed in such a manner as to move magnetic or hard material or to move along magnetic or hard material. The blade 9 has been foreshorten so as to barely penetrate the case of the impeller mechanism 10 and a tip 23 has been added to the blade 9. The tip 23 can be a harden and pointed tip capable of penetrating hard material or the tip 23 can be a magnet capable of attaching itself intermittently to magnetic material. If the impeller mechanism is fixed in relationship to other elements of the transport system the material will be moved, if the impeller mechanism is not fixed in relationship to other elements in the transport system the structure to which the impeller mechanism is attached will move.

Figure 8:
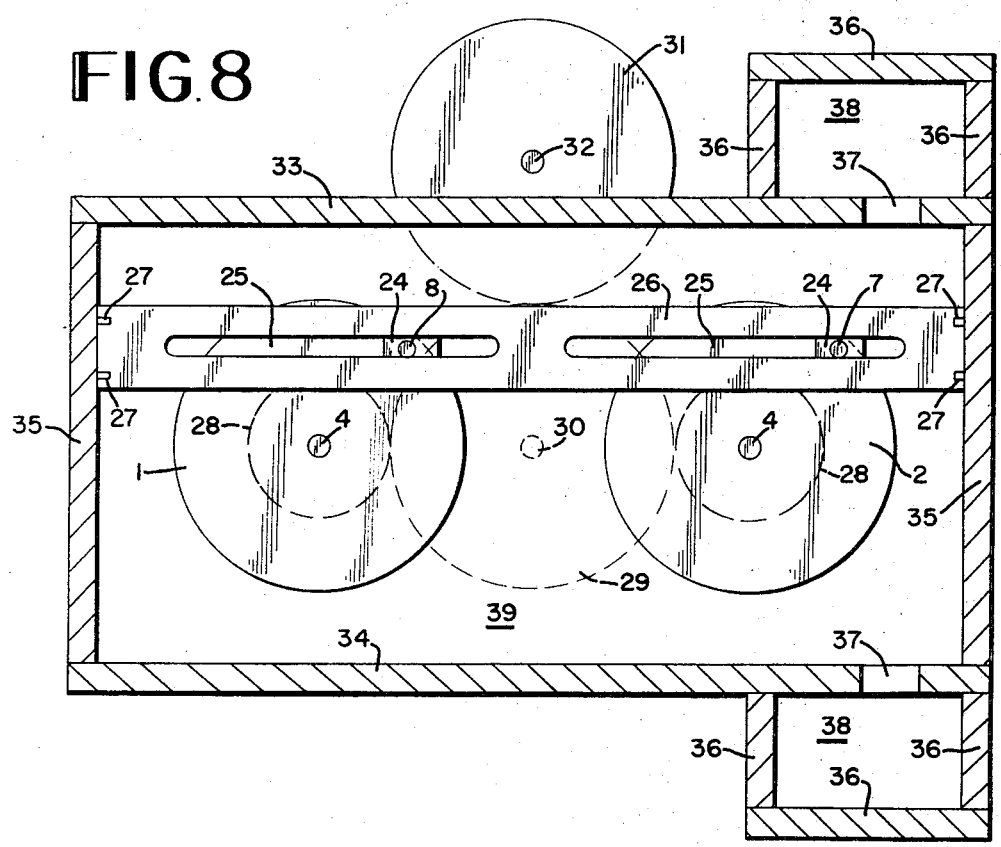
FIG. 8 is a diagramatic drawing which shows two of the basic impeller mechanisms as shown in FIGS. 1 and 4 configured to function as a prime mover or engine.

FIG. 8 is a diagramatic drawing which shows two of the basic impeller mechanisms as shown in FIGS. 1 and 4 configured to function as a prime mover or engine. In this configuration the blade 9 has been replaced by a piston 26 which is constrained to move up and down only by the end plates 35. The crank handles 7 and 8 have pillow block bearings 24 attached and slide horizontally in an elongated slot 25 in the piston 26 to accomodate the crank action provided by placing the crank handles 7 and 8 radially outward from the centers of shafts 4 on discs 1 and 2. The piston is enclosed by end plates 35, side plates 39, top plate 33 and bottom plate 34. The discs 1 and 2 are recessed into side plates 39 so as to present a smooth surface to the passage of the piston 26. The piston 26 is provided with piston rings 27 to provide a proper seal. The combustion/inlet/outlet chamber 38 is formed by plates 36 with outlet/inlet ports 37 and are located on each side of the piston 26. Expanding fluids under pressure created by combustion or other means are alternately allowed to enter one one side of the piston 26 through combustion/inlet/outlet chamber 38 while being exhausted on the other side. The pressure thus placed on one side of the piston 26 drives it up or down thus transmitting a force to the pillow block bearings 24 which in turn transmit a force to the crank handles 7 and 8 which rotate discs 1 and 2 which are connected to gears 28 by shafts 4. Gears 28 are meshed with output gear 29 which has an output shaft 30 attached. To mitigate the forces and bending moments involved crank arms 7 and 8 can be attached to discs 1 and 2 on each side of the piston. Discs 1 and 2 are attached to gears 28 which drive output gears 29 on each side. Timing gears 31 are meshed with output gears 30 on each side and are connected together by shaft 32.

FIG. 9 is a cutaway perspective drawing which shows the same configuration as FIG. 8. The disc 1 is shown recessed into the side plate 39 and the bearing/ seal required to make the system tight is shown as 40. The piston 26 is shown with rounded corners to minimize wear and friction problems at these points. The prime mover or engine is completed by the addition of cooling and lubrication systems, bearings, timing shafts and valves and other ancillaries to absorb the power output. Other methods of timing and output are possible such as by the use of sprocket wheels and sprocket chains. The prime mover or engine configuration of the basic impeller mechanism is capable of small piston, high speed operation or large piston slow speed operation. The expanding fluid under pressure can be obtained from any source such as in the conventional internal combustion engine, steam from a boiler, gas from a pressurized source, liquids under a pressure head from a dam or city water system or from almost any concievable source. The materials involved in the construction can be varied to fit the application.

I claim:

1. Impeller mechanism with an output which imparts parallel motion to a blade of variable configuration which results in the production of a predominant force component approximately perpendicular to the parallel motion when the blade is in contact with various substances into which it can penetrate or intermittently attach itself, said impeller mechanism comprising:

a pair of discs at the ends of two rotatable shafts in lubricated bearings in a foundation structure capable of maintaining the impeller mechanism in a fixed spatial position relative to other structure with crank handles attached radially outward from the disc shaft centers, constrained to rotate in a prescribed angular relationship to each other by configuration of the periphery of the discs as gears with a single drive gear between the two discs, with a blade of variable configuration attached to the crank handles through lubricated bearings in such a manner that it is free to rotate about the axes of the crank handles with the blade axis maintaining parallel motion with relationship to a line through the centers of the crank handles with the blade producing a predominant force component approximately perpendicular to the parallel motion when in contact with the various substances into which it can penetrate or intermittently attach itself.

when required, a sealing mechanism which allows the blade to move parallel to and perpendicular to the axis connecting the centers of the disc shafts while isolating the mechanism from the substance into which the blade penetrates or intermittently attaches itself consisting of a member slotted to allow penetration of the blade and oscillating in a track in the structure being penetrated by the blade to allow back and forth movement of the blade.

2. Impeller mechanism as set forth in claim 1 with a variable angle of the blade relative to the desired direction of the predominant component of the force or pressure produced when the blade penetrates or intermittently attaches itself to the substance during entry, uniform motion, retraction and during the return stroke.

3. Impeller mechanism as set forth in claim 1 with cover attached to further isolate the impeller mechanism from its surrounding environment.

4. Impeller mechanisms as set forth in claim 1 installed in series or parallel with the phase relationship of the blades of the various impeller mechanisms timed to minimize any fluctuations in force or pressure attendant to the characteristics of the force or pressure produced by the blades during their cyclic strokes.

5. Impeller mechanisms as set forth in claim 1 with the impeller mechanisms located in such a manner that the impeller mechanisms are constrained to remain in a fixed location relative to other elements in a transport system such that the force or pressure produced by the motion of the blades produces a movement of the substance within the transport system into which it has penetrated or intermittently attached itself.

6. Impeller mechanisms as set forth in claim 1 with the impeller mechanisms located in such a manner that they are free to move in relationship to other elements in a transport system such that the force or pressure produced by the motion of the blades when they have penetrated into or are in intermittent contact with the substance within the transport system produces a movement of the structure to which the impeller mechanisms are attached within the transport system.

7. Impeller mechanisms as set forth in claim 1 with a blade equipped with various tips to allow theblade to penetrate into or intermittently attach itslef to various substances.

8. Impeller mechanism as set forth in claim 1 with the periphery of the discs configured to receive a drive chain or gear toothed belt, with the appropriate chain or gear toothed belt connecting the two discs in lieu of the single gear drive.

* * * * *